United States Patent [19]

Suga et al.

[11] Patent Number: 5,576,400
[45] Date of Patent: Nov. 19, 1996

[54] PROCESS FOR PRODUCING OLEFIN POLYMER

[75] Inventors: Yoshinori Suga, Tokyo; Nobuo Enokido, Kanagawa, both of Japan

[73] Assignee: Mitsubishi Kasei Corporation, Tokyo, Japan

[21] Appl. No.: 100,183

[22] Filed: Aug. 2, 1993

Related U.S. Application Data

[63] Continuation of Ser. No. 916,608, Jul. 22, 1992, abandoned.

[30] Foreign Application Priority Data

Jul. 23, 1991 [JP] Japan ........................... 3-182676
Jun. 30, 1992 [JP] Japan ........................... 4-173153

[51] Int. Cl.$^6$ ........................... C08F 4/642; C08F 10/02
[52] U.S. Cl. ........................... 526/65; 502/103; 525/268; 526/119; 526/352
[58] Field of Search ........................... 526/119, 65; 525/268

[56] References Cited

U.S. PATENT DOCUMENTS

| | | | |
|---|---|---|---|
| 4,218,339 | 8/1980 | Zucchini et al. | 526/125 |
| 4,328,121 | 5/1982 | Capshew | 526/119 |
| 4,352,915 | 10/1982 | Mashita et al. | 526/65 |
| 4,357,448 | 11/1982 | Tsubaki et al. | 526/65 |
| 4,390,454 | 6/1983 | Cuffiani et al. | 526/119 |
| 4,414,369 | 11/1983 | Kuroda et al. | 526/65 |
| 4,456,695 | 6/1984 | Nimura et al. | 526/119 |
| 4,511,704 | 4/1985 | Tanaka et al. | 526/124 |
| 4,513,095 | 4/1985 | Speca | 526/124 |
| 4,525,554 | 6/1985 | Tanaka et al. | 526/124 |
| 4,760,120 | 7/1988 | Sano et al. | 526/124 |
| 4,996,011 | 2/1991 | Sano et al. | 526/124 |
| 5,082,818 | 1/1992 | Matsuura et al. | 526/125 |

FOREIGN PATENT DOCUMENTS

| | | |
|---|---|---|
| 0113937 | 7/1984 | European Pat. Off. |
| 3230604 | 3/1983 | Germany |
| 51-100984 | 9/1976 | Japan |
| 52-24292 | 2/1977 | Japan |

*Primary Examiner*—Edward J. Smith
*Attorney, Agent, or Firm*—Sughrue, Mion, Zinn, Macpeak & Seas

[57] ABSTRACT

A process for producing an olefin polymer comprising polymerizing an olefin or olefins in the presence of a catalyst system, in which the catalyst system comprises of (A) a hydrocarbon-insoluble solid catalyst component obtained by treating a uniform hydrocarbon solution containing (a) an magnesium compound, e.g., a dialkoxymagnesium, (b) an titanium compound, e.g., a titanium tetraalkoxide, and (c) a polyalkyltitanate represented by formula (I):

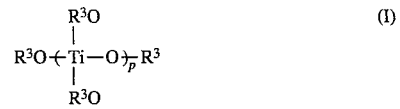

wherein $R^3$'s, which may be the same or different, each represent an alkyl group, an aryl group, or a cycloalkyl group; and p represents an integer of from 2 to 20, with a halogenating agent and (B) an organoaluminum compound. The resulting olefin polymer has broad molecular weight distribution, high melt tension, and high melt elasticity and is freed of fish eye by kneading under ordinary conditions.

13 Claims, 1 Drawing Sheet

PROCESS FOR PRODUCING OLEFIN POLYMER

This is a Continuation of application Ser. No. 07/916,608 filed Jul. 22, 1992, now abandoned.

FILED OF THE INVENTION

This invention relates to a novel catalyst system for production of olefin polymers. More particularly, it relates to a process for effectively producing an olefin polymer which exhibits broad molecular weight distribution, high melt elasticity (die swell ratio), and high melt tension and is therefore suited for blow molding or blown-film extrusion.

BACKGROUND OF THE INVENTION

While olefin polymers are widely and commonly used as molding materials for various articles, the characteristics required depend on the end use and the molding method employed. For example, olefin polymers having a narrow molecular weight distribution and a relatively low molecular weight are suitable for injection molding, and those having a broad molecular weight distribution and a relatively high molecular weight are suitable for blown-film extrusion or blow molding. In particular, for the purpose of maintaining bubble stability on high-speed blown-film extrusion, preventing drawdown in parison in blow molding especially for production of large-sized containers, and maintaining uniform ductility in blow molding for production of articles having a complicated shape, it is necessary to choose an olefin polymer having a high melt tension and a high melt elasticity (die swell ratio).

However, attempts to obtain an olefin polymer having improved melt tension or melt elasticity while exhibiting broadened molecular weight distribution often encounter difficulty in maintaining satisfactory productivity. For example, JP-A-52-24292 (the term "JP-A" as used herein means an "unexamined published Japanese patent application") proposes a process for producing an olefin polymer having a broad molecular weight distribution, a high melt tension, and a high die swell ratio. While this process achieves an improvement in die swell, the improvement attained is in a range that is not always sufficient for maintaining high productivity. Moreover, the process is disadvantageous because fish eyes cannot be avoided without powerful kneading beforehand.

SUMMARY OF THE INVENTION

An object of the present invention is to provide a process for effectively producing an olefin polymer having a broad molecular weight distribution, a high melt tension, and a high melt elasticity (die swell ratio) which causes no fish eyes even when kneaded under ordinary conditions.

Other objects and effects of the present invention will be apparent from the following description.

As a result of extensive investigations, the present inventors have now found that the above objects of the present invention can be accomplished by a process comprising homopolymerizing an olefin or copolymerizing an olefin and other copolymerizable olefin(s), in the presence of a catalyst system comprising (A) a hydrocarbon-insoluble solid catalyst component obtained by treating a uniform hydrocarbon solution containing:

an organomagnesium compound represented by formula $Mg(OR^1)_m X^1_{2-m}$, wherein $R^1$ represents an alkyl group, an aryl group, or a cycloalkyl group; $X^1$ represents a halogen atom; and m represents 1 or 2, (b) an organotitanium compound represented by formula $Ti(OR^2)_n X^2_{4-n}$, wherein $R^2$ represents an alkyl group, an aryl group, or a cycloalkyl group; $X^2$ represents a halogen atom; and n represents an integer of from 1 to 4, and (c) a polyalkyltitanate represented by formula (I):

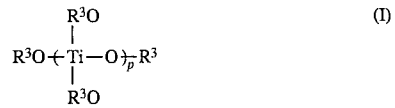

wherein $R^3$'s, which may be the same or different, each represent an alkyl group, an aryl group, or a cycloalkyl group; and p represents an integer of from 2 to 20, with a halogenating agent,
and (B) an organoaluminum compound.

In a preferred embodiment of the present invention, the uniform hydrocarbon solution further contains (d) an alcohol represented by formula $R^4OH$, wherein $R^4$ represents an alkyl group, an aryl group, or a cycloalkyl group.

DETAILED DESCRIPTION OF THE INVENTION

Figure 1:
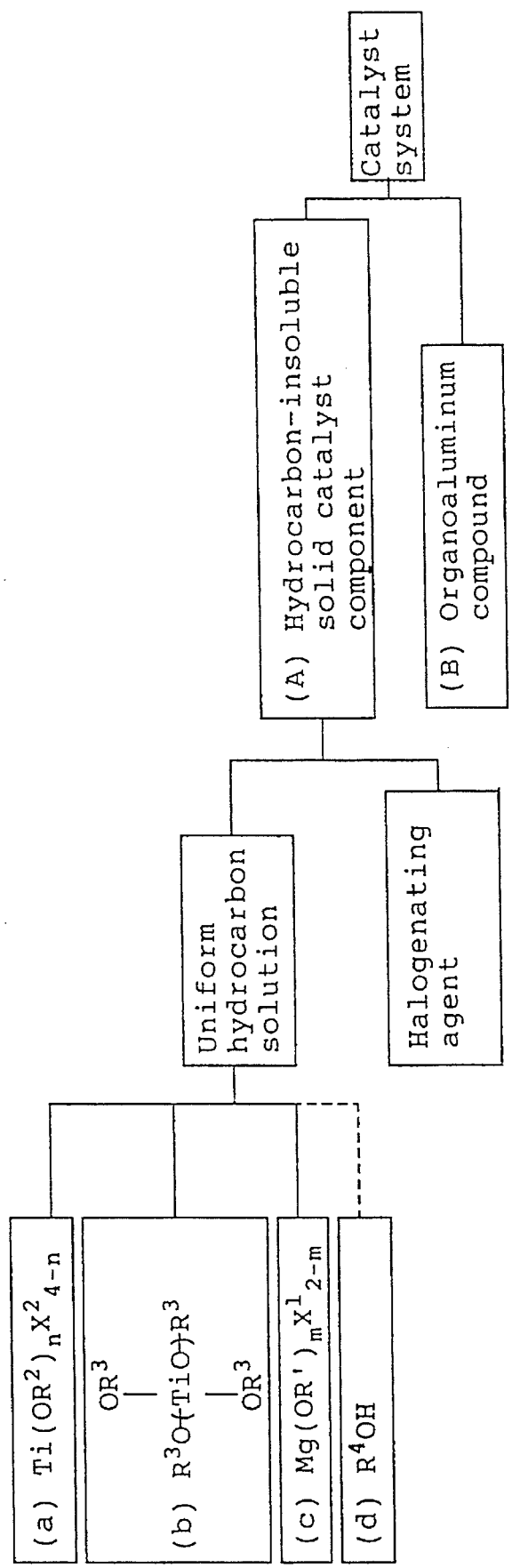
FIG. 1 shows a diagram of the preparation of the catalyst system used in the process according to the present invention.

In the organomagnesium compound (a) represented by formula $Mg(OR^1)_m X^1_{2-m}$, examples of $R^1$ include an alkyl, aryl or cycloalkyl group having up to about 15 carbon atoms, such as methyl, ethyl, propyl, butyl, pentyl, hexyl, octyl, tolyl, xylyl, and cyclohexyl groups; and examples of $X^1$ include chlorine, bromine and iodine atoms. Specific examples of the organomagnesium compound (a) include dimethoxymagnesium, diethoxymagnesium, ethoxymagnesium chloride, and diphenoxymagnesium. Preferred of them are those represented by formula $Mg(OR^1)_2$, and the most preferred is diethoxymagnesium.

In the organotitanium compound (b) represented by formula $Ti(OR^2)_n X^4_{2-n}$, examples of $R^2$ and $X^2$ include those enumerated above for $R^1$ and $X^1$, respectively. Specific examples of the organotitanium compound (b) include those wherein n is 4, e.g., titanium tetraethoxide, titanium tetrapropoxide, and titanium tetra-n-butoxide; those wherein n is 3, e.g., titanium monochlorotriethoxide, titanium monochlorotripropoxide, and titanium monochlorotri-n-butoxide; those wherein n is 2, e.g., titanium dichlorodiethoxide, titanium dichlorodipropoxide, and titanium dichlorodi-n-butoxide; and those wherein n is 1, e.g., titanium trichloroethoxide, titanium trichloropropoxide, and titanium trichloro-n-butoxide. Preferred of them are those wherein n is 4 or 3, with titanium tetra-n-butoxide and titanium monochlorotri-n-butoxide being particularly preferred, and titanium tetra-n-butoxide being the most preferred.

In the polyalkyltitanate (c) represented by formula (I), examples of $R^3$ include those enumerated above for $R^1$, and preferred examples of $R^3$ include a butyl group and an isopropyl group. Additionally, a condensate of a titanium tetraalkoxide which is obtained by reacting a titanium tetraalkoxide with a small amount of water may be used as component (c). Two or more kinds of the polyalkyltitanates may be employed in combination.

In the alcohol (d) represented by formula $R^4OH$ which may be used if desired, examples of $R^4$ include those enumerated above for $R^1$. Specific examples of the alcohol (d) include ethyl alcohol, n-propyl alcohol, isopropyl alcohol, n-butyl alcohol, n-pentyl alcohol, and n-octyl alcohol.

The solid catalyst component (A) which can be used in the present invention is prepared by treating a uniform hydrocarbon solution containing the above-described components (a), (b), (c), and, if desired, (d) with a halogenating agent.

The components (a) to (c) are generally used at molar ratios satisfying the relations:

$$0.01 \leq (b)/(a) \leq 10$$

and $$0.1 \leq (c)/(a) \leq 50.$$

Where a trialkylaluminum or a combination of a trialkylaluminum and a dialkylaluminum chloride is used as an organoaluminum compound (B) as hereinafter described, the components (a) to (c) are preferably used at molar ratios:

$$0.05 \leq (b)/(a) \leq 5$$

and $$0.5 \leq (c)/(a) \leq 10.$$

Where a dialkylaluminum chloride is used as an organoaluminum compound (B) as hereinafter described, the components (a) to (c) are preferably used at molar ratios:

$$0.05 \leq (b)/(a) \leq 5$$

and $$0.10 \leq (c)/(a) \leq 1.$$

If the (b)/(a) and (c)/(a) molar ratios deviate from the above-described respective range, there are tendencies that the resulting catalyst system has reduced activity or the olefin polymer produced has insufficient breadth in molecular weight distribution or insufficient melt tension or melt elasticity. Should this be the case, the olefin polymer exhibits poor molding properties, such as non-uniform ductility, in producing large-sized containers by blow molding or only produces molded articles having poor impact strength.

In the preparation of the uniform hydrocarbon solution, all the components (a) to (c) are simultaneously mixed, or the components (a) and (b) are first mixed together, and then the component (c) is added thereto. The mixing is preferably effected under heating to a temperature of from 100° to 170° C. to obtain a uniform liquid. If there is a difficulty in uniformly mixing, the alcohol (d) is preferably added. The addition amount of the alcohol (d) is generally from 0.1 to 5 mol, preferably from 0.5 to 2 mol, per mol of the organomagnesium compound (a). The order of addition of the components (a) to (d) is not particularly limited.

To the resulting uniform liquid containing or not containing an alcohol is added a hydrocarbon solvent to obtain a uniform hydrocarbon solution. Where the liquid contains an alcohol, the hydrocarbon solvent may be added after removing the alcohol by distillation. Further, the component (c) may be added after once preparing a uniform hydrocarbon solution containing the components (a) and (b).

Examples of the hydrocarbon solvent to be used for dissolving the components (a) to (d) includes aliphatic hydrocarbons, e.g., hexane and heptane, alicyclic hydrocarbons, e.g., cyclohexane, and aromatic hydrocarbons, e.g., benzene, toluene, and xylene. The amount of the hydrocarbon solvent used is generally such an amount that the total concentration of the components (a) to (c) becomes 0.01 mol/l, and preferably from 0.1 to 2 mol/l.

The resulting uniform hydrocarbon solution is then treated with a halogenating agent to obtain a hydrocarbon-insoluble solid catalyst component (A). The halogenating agent to be used is not particularly limited as far as it has a halogenating action. Compounds containing a halogen atom through a covalent bond are usually employed. Examples of such halogenating agents include chlorides, such as boron trichloride, titanium tetrachloride, silicon tetrachloride, tin tetrachloride, vanadium tetrachloride, and aluminum chloride; chlorine-containing compounds, such as hydrogen chloride, thionyl chloride, and chlorosulfonic acid; chlorine, and bromine. Particularly preferred of them are titanium tetrachloride and silicon tetrachloride.

Treating conditions are not particularly critical, but the treating temperature preferably ranges from room temperature to 200° C. At temperatures exceeding 200° C., the chain structure Ti—O—Ti in the polyalkyltitanate tends to be disadvantageously destroyed.

The halogenation treatment may be carried out either once or more. The degree of halogenation is not limited, and is generally such an extent that the halogen amount is 1.0 gram equivalent or more, preferably from 3.0 to 20 gram equivalent per total gram equivalent of $OR^1$, $OR^2$, $OR^3$ and $R^4OH$. If the degree of halogenation is too low, there is a tendency that the resulting catalyst system has insufficient activity or the polyolefin produced has insufficient breadth in its molecular weight distribution.

The insoluble matter in the resulting reaction mixture is then separated therefrom and washed with a hydrocarbon solvent to recover a solid catalyst component (A).

If desired, a small amount of an electron-donating compound may be added in any stage before formation of the solid catalyst component (A), or the solid catalyst component obtained may be treated with a small amount of an electron-donating compound.

Examples of the electron-donating compounds include phosphorus-containing compounds, oxygen-containing compounds, sulfur-containing compounds, and nitrogen-containing compounds, with oxygen-containing compounds being preferred.

Examples of the oxygen-containing compounds include those represented by formula $R^6OR^7$, those represented by formula $R^6COR^7$, and those represented by formula $R^6(COOR^7)_k$, wherein $R^6$ and $R^7$ each represent an alkoxy-substituted or unsubstituted hydrocarbon group, which may be connected to each other to form a cyclic group; and k represents an integer of from 1 to 3. Specific examples of these oxygen-containing compounds which are preferably used include aromatic polycarboxylic acid esters, such as dimethyl phthalate, diethyl phthalate, dibutyl phthalate, and diheptyl phthalate; metal salts of aromatic polycarboxylic acids, such as $(O-C_6H_4)_3(COO)_6B_2$, $O-C_6H_4(COOTiCl_3)_2$, and $O-C_6H_4(COOGe(CH_3)_3)_2$; carboxylic acid esters, such as ethyl phenylacetate, methyl benzoate, ethyl benzoate, methyl toluylate, methyl anisate, ethyl anisate, methyl ethoxybenzoate, and ethyl cinnamate; and silicon-containing carboxylic acid esters, such as β-trimethoxysilylethyl benzoate. The amount of the electron-donating compound to be used is not particularly limited, but is usually not more than 10 mols, and preferably from 0.01 to 1 mol, per mol of the organomagnesium compound (a).

Examples of the organoaluminum compound (B) used as a co-catalyst includes compounds represented by formula AlR$^5_q$X$^5_{3-q}$, wherein R$^5$ represents an alkyl group, an aryl group, or a cycloalkyl group; X$^5$ represents a halogen atom; and q represents an integer of from 1 to 3. Specific examples of such organoaluminum compounds include trialkylaluminums, such as triethylaluminum, tri-n-propylaluminum, and triisobutylaluminum; alkylaluminum halides, such as diethylaluminum monochloride, isobutylaluminum monochloride, and diethylaluminum sesquichloride; and reaction products between an organoaluminum compound and water. These organoaluminum compounds may be used either individually or in combination of two or more thereof. Preferred of them are a trialkylaluminum, a dialkylaluminum monochloride, and a combination of a trialkylaluminum and a dialkylaluminum monochloride.

The organoaluminum compound (B) is used in a concentration usually of from 0.01 to 0.50 mmol/l, preferably of from 0.02 to 0.30 mmol/l, and more preferably of from 0.04 to 0.02 mmol/l, based on the amount of a polymerization solvent used, and at an atomic ratio of Al to Ti in the solid catalyst component (A) (Al/Ti) of from 0.1 to 3.5, preferably from 0.2 to 2.5, and more preferably from 0.3 to 1.5. If the amount of the organoaluminum compound (B) is higher than 0.50 mmol/l in concentration or 3.5 in Al/Ti atomic ratio, the resulting polymer tends to have a narrow molecular weight distribution and to exhibit poor molding properties, such as non-uniform ductility, in blow molding for production of large-sized containers. If it is lower, the catalyst system tends to have reduced activity, failing to achieve sufficient productivity.

Examples of the olefins which can be homopolymerized or copolymerized by using the thus prepared catalyst system include α-olefins, such as ethylene, propylene, butene-1, pentene-1, hexene-1, octene-1, 4-methylpentene-1, 3-methylbutene-1, and styrene. The process of the present invention is also applicable to copolymerization of these α-olefins with dienes. The process of the present invention is particularly advantageous for production of an ethylene homopolymer or an ethylene copolymer containing up to 10% by weight, and preferably up to 5% by weight, of other α-olefins. The process is also suitable for production of a propylene homopolymer or a random or block copolymer of propylene and other α-olefins.

The polymerization reaction of an olefin(s) is usually carried out by slurry polymerization or solution polymerization in the presence of an inert solvent or gaseous polymerization in the absence of an inert solvent. Examples of the inert solvents include aliphatic hydrocarbons, such as butane, hexane, and octane; alicyclic hydrocarbons, such as cyclohexane; aromatic hydrocarbons, such as benzene and toluene; and liquid α-olefins.

If desired, the olefin polymerization may be carried out in the presence of a small amount of an electron-donating compound in combination of the catalyst system according to the present invention. Usable electron-donating compounds include those enumerated above and, in addition, silicon-containing compounds represented by formula R$^8_n$Si(OR$^9$)$_{4-n}$, wherein R$^8$ and R$^9$ each represent an alkyl-substituted or unsubstituted hydrocarbon group; and n represents an integer of from 0 to 4. The amount of the electron-donating compound to be used is not particularly critical, and is usually not more than 100 mols, and preferably from 1 to 50 mols, per mol of Ti atom in the solid catalyst component (A).

The polymerization reaction is usually conducted at a temperature of from room temperature to 200° C. under a pressure of from atmospheric pressure to 100 atm. The molecular weight can be controlled easily by introducing hydrogen into the reaction zone.

The polymerization reaction may also be carried out in a multi-stage process. In one embodiment, a polymerization reaction is conducted in two stages in which polymerization is continued in a second reaction zone in the presence of a reaction product obtained in a first reaction zone. That is, taking an ethylene homo- or copolymer as an instance, ethylene is homopolymerized in the first reaction zone to form Polymer A having a viscosity-average molecular weight of from 40,000 to 150,000 to a proportion of from 60 to 90% by weight based on the total polymer produced. In the second reaction zone, ethylene is homopolymerized or copolymerized with other α-olefin(s) in the presence of Polymer A to form Polymer B having the α-olefin content of not more than 10% by weight and a viscosity-average molecular weight of from 500,000 to 4,000,000 to a proportion of from 10 to 40% by weight based on the total polymer produced. Alternatively, Polymer B is formed in the first reaction zone, and Polymer A is then formed in the second reaction zone in the presence of Polymer B. The molecular weight ratio of Polymer B to Polymer A is controlled to fall within a range of from 3 to 50, and the melt index of the total polymer produced is adjusted not to exceed 0.5 g/10 min as measured according to ASTM-1238 57T at 190° C. under a load of 5 kg.

FIG. 1 shows a diagram of the preparation of the catalyst system used in the process according to the present invention to facilitate understanding the technical features of the present invention, but the present invention is not deemed to be limited thereto.

According to the process of the present invention, an olefin polymer having broad molecular weight distribution, high melt tension, and high melt elasticity (die swell ratio) can be obtained with high activity, i.e, high productivity. Additionally, the resulting polymer exhibits high uniformity and is therefore free of fish eye.

The present invention is now illustrated in greater detail by way of Examples, but it should be understood that the present invention is not deemed to be limited thereto. All the percents are given by weight unless otherwise indicated.

The polymerization activity of the catalyst system prepared and the physical properties of the olefin polymers obtained were evaluated according to the following test methods.

1) Polymerization Activity K: Obtained from equation:

$$K=(g\text{-polymer})/(g\text{-catalyst})\cdot(\text{hr})\cdot(\text{olefin partial pressure})$$

2) Melt Index:
Measured according to ASTM D 1238 57T at a temperature of 190° C. under a load of 5 kg.

3) Efflux Rate Ratio:
The rate of efflux was measured according to ASTM D 1238 57T under a load each of 21.6 kg and 5 kg to obtain an efflux rate ratio representing shear stress dependence of melt viscosity as an indication of a molecular weight distribution. The greater the efflux rate ratio, the broader the molecular weight distribution, and vice versa.

4) Melt Tension, Die Swell Ratio:
Measurements were made with a full-automatic melt rheometer manufactured by Intesco Co. The melt tension (g) was measured by using a nozzle of 1 mm in diameter, 5 mm in length, and 90° in entrance angle under conditions of 190° C. in temperature, $10^4$ sec$^{-1}$ in shear rate, and 1.0 m/min in take-off speed. The die swell ratio was obtained by extruding a sample molten resin from the same nozzle at a resin temperature of 190° C. and a shear rate of $10^4$ sec$^{-1}$ to obtain a strand and measuring the diameter of the strand to obtain a ratio of strand cross-section area to nozzle cross-section area.

5) Fish Eye:

A sample resin was formed into pellets and was press molded by means of a single-screw extruder (diameter: 30 mm) having a full-flighted screw to obtain a sheet, and the sheet was vacuum formed into a hat shape to see fish eyes.

6) Zero Shear Viscosity ($\eta_0$):

In general, a shear viscosity of a molten polymer reaches a stationary value in a low shear rate area ($10^3$ sec or less) and decreases as the shear rate increases. The terminology "zero shear viscosity ($\eta_0$)" means the stationary value reached.

The measurement was made by means of a cone-and-plate viscometer ("Stress Rheometer RSR-M" manufactured by Rheometrics Co.; diameter: 25 mm; angle between the cone and the plate: 0.1 rad) with which a melt shear viscosity in a low shear rate area can be obtained from the creep characteristics. The specimen was prepared by press molding the pellets of a sample into a sheet having a thickness of about 1 mm. The measuring temperature was 190° C.

In blow molding for obtaining large-sized articles, if the $\eta_0$ at 190° C. is lower than $1\times10^7$ poise, the increase of stress during melt extension is small to reduce uniform ductility. If it is higher than $1\times10^8$ poise, molding properties, such as extrudability, are reduced.

7) Izod Impact Strength:

Measured according to ASTM D256 73.

EXAMPLE 1

1) Preparation of Solid Catalyst Component:

In a 1 l flask equipped with a condenser having been thoroughly purged with nitrogen were charged 13.0 g (113.3 mmol) of Mg(OEt)$_2$ (Et: ethyl), 19.2 g (56.4 mmol) of Ti(OBu)$_4$ (Bu: butyl), and 208.2 g of tetrabutoxytitanium tetramer represented by formula:

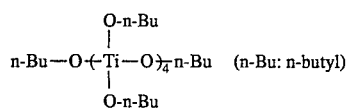

The mixture was heated to 130° C. and maintained at that temperature for 4 hours with stirring to obtain a uniform viscous liquid. After cooling, 280 ml of toluene was added thereto to obtain a uniform toluene solution.

A 5.7% portion of the toluene solution was put in a 500 ml four-necked flask having been thoroughly purged with nitrogen, and 41 ml of TiCl$_4$ was added thereto as a halogenating agent at room temperature over 15 minutes. The temperature was elevated to 110° C., at which the mixture was maintained for 1 hour to conduct halogenation. After cooling to room temperature, the reaction mixture was thoroughly washed with n-hexane to obtain 5.0 g of a solid catalyst component. The solid catalyst component was found to have a Ti content of 33.4%.

2) Polymerization of Ethylene:

One liter of n-hexane was charged in a 2 l autoclave having been thoroughly purged with nitrogen, and 0.32 mmol of triethylaluminum was added thereto, followed by heating to 85° C. Hydrogen gas was introduced into the autoclave to the partial pressure shown in Table 1 below, and 20 mg of the solid catalyst component prepared above was fed thereto together with ethylene to commence polymerization. The polymerization reaction was continued at 85° C. for 1 hour while feeding ethylene to keep the total pressure at 10 kg/cm$^2$. Ethanol was then introduced therein under pressure to terminate the reaction, and the polymer produced was recovered by filtration and dried.

The resulting polymer powder was pelletized under the above-mentioned conditions, and the melt index, efflux rate ratio (indication of molecular weight distribution), melt tension, die swell ratio, zero shear viscosity ($\eta_0$), Izod impact strength, and occurrence of fish eye were measured under the above-mentioned conditions. The results obtained are shown in Tables 1 and 2.

EXAMPLE 2

Ethylene polymerization was carried out in the same manner as in Example 1, except for replacing the tetrabutoxytitanium tetramer as used in the preparation of the solid catalyst component with 253.9 g of tetrapropoxytitanium pentamer represented by formula:

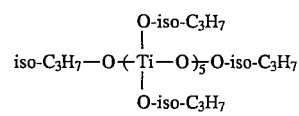

The results of measurements are shown in Tables 1 and 2.

EXAMPLE 3

Ethylene polymerization was carried out in the same manner as in Example 1, except for replacing TiCl$_4$ as used as a halogenating agent in the preparation of the solid catalyst component with SiCl$_4$ and conducting the halogenation treatment at 57° C. The results of measurements are shown in Tables 1 and 2.

EXAMPLE 4

Ethylene polymerization was carried out in the same manner as in Example 1, except for changing the amount of the tetrabutoxytitanium tetramer to 164.2 g and conducting the polymerization of ethylene at 80° C. The results of measurements are shown in Tables 1 and 2.

EXAMPLE 5

Ethylene polymerization was carried out in the same manner as in Example 1, except for changing the amount of the tetrabutoxytitanium tetramer to 260.2 g. The results of measurements are shown in Tables 1 and 2.

EXAMPLE 6

Ethylenespolymerization was carried out in the same manner as in Example 1, except for changing the amount of Mg(OEt)$_2$ to 26.0 g (226.6 mmol) and additionally using 10.4 ml of n-butanol in the preparation of the toluene solution. The results of measurements are shown in Tables 1 and 2.

EXAMPLE 7

1) Preparation of Solid Catalyst Component:

In a 1 l flask equipped with a condenser having been thoroughly purged with nitrogen were charged 13.0 g (113.3 mmol) of Mg(OEt)2, 19.2 g (56.4 mmol) of Ti(OBu)$_4$, and the mixture was heated to 130° C. and maintained at that temperature for 4 hours with stirring to obtain a uniform viscous liquid. After cooling, 280 ml of toluene was added thereto to form a uniform toluene solution. To the toluene solution was added 208.2 g of tetrabutoxytitanium tetramer.

A 6.0% portion of the toluene solution was put in a 500 ml four-necked flask having been thoroughly purged with nitrogen, and 41 ml of TiCl$_4$ was added thereto as a halogenating agent at room temperature over 15 minutes. The temperature was elevated to 110° C., at which the mixture was maintained for 1 hour to conduct halogenation. After cooling to room temperature, the mixture was thoroughly washed with n-hexane to recover a solid catalyst component.

2) Polymerization of Ethylene:

Ethylene was polymerized in the same manner as in Example 1, except for using the above prepared solid catalyst component. The results of measurements are shown in Tables 1 and 2.

EXAMPLE 8

One liter of n-hexane was charged in a 2 l autoclave having been thoroughly purged with nitrogen, and 0.32 mmol of triethylaluminumwas added thereto, followed by heating to 85° C. Hydrogen gas was introduced into the autoclave to the partial pressure shown in Table 1, and 20 mg of the solid catalyst component obtained in Example 1 was fed thereto together with ethylene and 1.8 g of butene-1 to commence polymerization. The polymerization reaction was continued at 85° C. for 1 hour while feeding ethylene to keep the total pressure at 10 kg/cm$^2$. Ethanol was introduced therein under pressure to stop the reaction, and the polymer produced was recovered by filtration and dried.

The resulting copolymer had a butene-1 content of 0.1 mol % and a density of 0.957 g/cm$^2$. The results of other measurements are shown in Tables 1 and 2.

Comparative Example 1

1) Preparation of Solid Catalyst Component:

In a 1 l flask equipped with a condenser having been thoroughly purged with nitrogen were charged 13.0 g (113.3 mmol) of Mg(OEt)$_2$ and 208.2 g of tetrabutoxytitanium tetramer. The mixture was heated to 130° C. and maintained at that temperature for 4 hours while stirring to obtain a viscous liquid. After cooling, 280 ml of toluene was added thereto to form a toluene slurry.

A 5.6% portion of the toluene slurry was put in a 500 ml four-necked flask having been thoroughly purged with nitrogen, and 41 ml of TiCl$_4$ was added thereto as a halogenating agent at room temperature over 15 minutes. The temperature was elevated to 110° C., at which the mixture was maintained for 1 hour to conduct halogenation. After cooling to room temperature, the mixture was thoroughly washed with n-hexane to obtain a solid catalyst component.

2) Polymerization of Ethylene:

Ethylene was polymerized in the same manner as in Example 1, except for using the above prepared solid catalyst component. The results of measurements are shown in Tables 1 and 2.

Comparative Example 2

1) Preparation of Solid Catalyst Component:

In a 1 l flask equipped with a condenser having been thoroughly purged with nitrogen were charged 5.0 g of Mg(OMe)$_2$ (Me: methyl) and 15 g of tetraisopropoxytitanium pentamer. The mixture was heated to 130° C. and maintained at that temperature for 4 hours with stirring to obtain a viscous mixture. After cooling, 280 ml of toluene was added thereto to form a toluene slurry. To the slurry was added 75 ml of TiCl$_4$ as a halogenating agent at room temperature over 15 minutes. The temperature was elevated to 110° C., at which the mixture was maintained for 1 hour to conduct halogenation. After cooling to room temperature, the mixture was thoroughly washed with n-hexane to obtain a solid catalyst component.

2) Polymerization of Ethylene:

Ethylene was polymerized in the same manner as in Example 1, except for using the above-prepared solid catalyst component. The results of measurements are shown in Tables 1 and 2.

Comparative Example 3

1) Preparation of Solid Catalyst Component:

In a 1 l flask equipped with a condenser having been thoroughly purged with nitrogen were charged 13.0 g (113.3 mmol) of Mg(OEt)$_2$ and 19.2 g (56.4 mmol) of Ti(OBu)$_4$. The mixture was heated to 130° C. and maintained at that temperature for 4 hours while stirring to obtain a uniform viscous liquid. After cooling, 280 ml of toluene was added thereto to form a uniform toluene solution.

A 5.8% portion of the toluene solution was put in a 500 ml four-necked flask having been thoroughly purged with nitrogen, and 41 ml of TiCl$_4$ was added thereto as a halogenating agent at room temperature over 15 minutes. The temperature was elevated to 110° C. at which the mixture was maintained for 1 hour to conduct halogenation. After cooling to room temperature, the mixture was thoroughly washed with n-hexane to obtain a solid catalyst component. 2) Polymerization of Ethylene:

Ethylene was polymerized in the same manner as in Example 1, except for using 5 mg of the above-prepared solid catalyst component. The results of measurements are shown in Tables 1 and 2.

Comparative Example 4

1) Preparation of Solid Catalyst Component:

In a 1 flask equipped with a condenser having been thoroughly purged with nitrogen was charged 11.9 g of tetrabutoxytitanium tetramer, and 30 ml of toluene was added thereto to prepare a solution. To the solution was added 41 ml of TiCl$_4$ as a halogenating agent at room temperature over 15 minutes. The temperature was elevated to 110° C., at which the mixture was maintained for 1 hour to conduct halogenation. After cooling to room temperature, the mixture was thoroughly washed with n-hexane to obtain a solid catalyst component. 2) Polymerization of Ethylene:

Ethylene was polymerized in the same manner as in Example 1, except for using the above-prepared solid catalyst component. The results of measurements are shown in Tables 1 and 2.

EXAMPLE 9

One liter of n-hexane was charged in a 2 l autoclave having been thoroughly purged with nitrogen, and 0.12 mmol of triethylaluminum was added thereto, followed by heating to 80° C. Hydrogen gas was introduced into the autoclave to the partial pressure shown in Table 1, and 30 mg of the solid catalyst component obtained in Example 1 was fed thereto together with ethylene to commence polymerization. The polymerization reaction was continued at 80° C. for 2 hours while feeding ethylene to keep the total pressure at 14 kg/cm$^2$. Ethanol was introduced therein under pressure to terminate the reaction, and the polymer produced was recovered by filtration and dried. The results of measurements are shown in Tables 1 and 2.

EXAMPLE 10

Ethylene polymerization was carried out in the same manner as in Example 9, except for changing the polymerization temperature and time to 90° C. and 1 hour, respectively. The results of measurements are shown in Tables 1 and 2.

EXAMPLE 11

Ethylene polymerization was carried out in the same manner as in Example 9, except for changing the amount of triethylaluminum to 0.24 mmol, changing the hydrogen partial pressure as shown in Table 1, and changing the polymerization time to 1 hour. The results of measurements are shown in Tables 1 and 2.

EXAMPLE 12

1) Preparation of Solid Catalyst Component:

A solid catalyst component was prepared in the same manner as in Example 1, except for changing the amount of tetrabutoxytitanium tetramer to 364.4 g. The resulting solid catalyst component had a Ti content of 34.7%.

2) Polymerization of Ethylene:

Ethylene polymerization was carried out in the same manner as in Example 9, except for using the above-prepared solid catalyst component and changing the hydrogen partial pressure as shown in Table 1. The results of measurements are shown in Tables 1 and 2.

EXAMPLE 13

Ethylene polymerization was carried out in the same manner as in Example 9, except for using the solid catalyst component prepared in Example 4 and changing the hydrogen partial pressure as shown in Table 1. The results of measurements are shown in Tables 1 and 2.

EXAMPLE 14

Ethylene polymerization was carried out in the same manner as in Example 9, except for changing the amount of n-hexane to 1.33 l, replacing 0.12 mmol of triethylaluminum with 0.12 mmol of triethylaluminum and 0.04 mmol of diethylaluminum monochloride, changing the amount of the solid catalyst component to 20 mg, extending the polymerization time to 4 hours, and changing the hydrogen partial pressure as shown in Table 1. The results of measurements are shown in Tables 1 and 2.

EXAMPLE 15

Ethylene polymerization was carried out in the same manner as in Example 11, except for replacing triethylaluminum with diethylaluminum monochloride, extending the polymerization time to 3 hours, and changing the hydrogen partial pressure as shown in Table 1. The results of measurements are shown in Tables 1 and 2.

Comparative Example 5

Ethylene polymerization was carried out in the same manner as in Comparative Example 2, except for changing the amount of triethylaluminum as shown in Table 1 and changing the polymerization temperature to 80° C. The results of measurements are shown in Tables 1 and 2.

TABLE 1

| | Polymerization Conditions And Catalyst Activity | | | | | |
|---|---|---|---|---|---|---|
| | Organoaluminum Compound | | Polymerization Temp. (°C.) | Hydrogen Partial Pressure (kg/cm$^2$) | Yield of Polymer (g) | Catalyst Activity K |
| Example No. | Concentration (mmol/l) | Al/Ti Atomic Ratio | | | | |
| Example 1 | 0.32 | 2.4 | 85 | 2.5 | 282 | 2,040 |
| Example 2 | 0.32 | 2.5 | 85 | 3.0 | 241 | 1,880 |
| Example 3 | 0.32 | 2.0 | 85 | 3.0 | 209 | 1,630 |
| Example 4 | 0.32 | 2.4 | 80 | 3.0 | 241 | 1,880 |
| Example 5 | 0.32 | 2.4 | 85 | 4.0 | 142 | 1,310 |
| Example 6 | 0.32 | 3.1 | 85 | 2.5 | 262 | 1,900 |
| Example 7 | 0.32 | 2.4 | 85 | 3.0 | 256 | 2,000 |
| Example 8 | 0.32 | 2.4 | 85 | 2.5 | 304 | 2,200 |
| Example 9 | 0.12 | 0.6 | 80 | 7.3 | 284 | 725 |
| Example 10 | 0.12 | 0.6 | 90 | 7.3 | 301 | 1,560 |
| Example 11 | 0.24 | 1.2 | 80 | 5.3 | 386 | 1,625 |
| Example 12 | 0.12 | 0.6 | 80 | 6.8 | 246 | 625 |
| Example 13 | 0.12 | 0.6 | 80 | 6.7 | 388 | 900 |
| Example 14 | 0.12 | 1.2 | 80 | 7.5 | 354 | 541 |
| Example 15 | 0.24 | 1.2 | 80 | 8.0 | 216 | 391 |
| Comparative Example 1 | 0.32 | 2.4 | 85 | 3.5 | 61 | 515 |
| Comparative Example 2 | 0.32 | 3.5 | 85 | 2.5 | 123 | 960 |
| Comparative Example 3 | 0.32 | 25 | 85 | 1.5 | 368 | 9320 |
| Comparative Example 4 | 0.32 | 2.2 | 85 | 5.5 | 11.7 | 150 |
| Comparative | 0.12 | 0.6 | 80 | 5.5 | 70 | 617 |

TABLE 2

| Example No. | Melt Index (g/10 min) | Efflux Rate Ratio | Melt Tension (g) | Die Swell Ratio | $\eta_0$ (poise) | Izod Impact Strength (Kg·cm/cm) 23° C. | Izod Impact Strength (Kg·cm/cm) −40° C. | Fish Eye |
|---|---|---|---|---|---|---|---|---|
| Example 1 | 0.15 | 17 | 11.5 | 4.1 | $1.1 \times 10^7$ | 51 NB* | 46 NB | none |
| Example 2 | 0.18 | 18 | 10.8 | 4.2 | $1.2 \times 10^7$ | 53 NB | 51 NB | none |
| Example 3 | 0.13 | 18 | 12.0 | 4.0 | $1.1 \times 10^7$ | — | — | none |
| Example 4 | 0.15 | 16 | 11.0 | 4.0 | $1.0 \times 10^7$ | — | — | none |
| Example 5 | 0.16 | 17 | 12.0 | 4.1 | $1.3 \times 10^7$ | — | — | none |
| Example 6 | 0.14 | 20 | 11.8 | 4.1 | $1.2 \times 10^7$ | — | — | none |
| Example 7 | 0.22 | 18 | 10.0 | 4.2 | $1.0 \times 10^7$ | — | — | none |
| Example 8 | 0.14 | 17 | 11.3 | 4.1 | $1.1 \times 10^7$ | — | — | none |
| Example 9 | 0.10 | 28 | 19.8 | 5.2 | $5.8 \times 10^7$ | 59 NB | 41 NB | none |
| Example 10 | 0.28 | 20 | 18.0 | 5.0 | $4.6 \times 10^7$ | 56 NB | 35 NB | none |
| Example 11 | 0.14 | 17 | 16.2 | 4.9 | $2.3 \times 10^7$ | 58 NB | 58 NB | none |
| Example 12 | 0.11 | 22 | 21.1 | 5.6 | $5.6 \times 10^7$ | 59 NB | 54 NB | none |
| Example 13 | 0.30 | 17 | 11.8 | 6.3 | $2.8 \times 10^7$ | 62 NB | 39 NB | none |
| Example 14 | 0.14 | 23 | 20.0 | 5.5 | $5.7 \times 10^7$ | 59 NB | 57 NB | none |
| Example 15 | 0.20 | 30 | 20.0 | 5.5 | $5.9 \times 10^7$ | 56 NB | 55 NB | none |
| Comparative Example 1 | 0.12 | 18 | 9.5 | 3.6 | $0.8 \times 10^7$ | 25 | 16 | many |
| Comparative Example 2 | 0.16 | 10 | 7.0 | 3.1 | $0.5 \times 10^7$ | 23 | 17 | many |
| Comparative Example 3 | 0.13 | 7 | — | — | $0.3 \times 10^7$ | — | — | none |
| Comparative Example 4 | 0.10 | 15 | — | — | — | — | — | none |
| Comparative Example 5 | 0.25 | 14 | 9.5 | 3.5 | $0.8 \times 10^7$ | — | — | many |

Note:
NB: The specimen after the test was not completely destroyed.

EXAMPLE 16

In a 2 l autoclave having been thoroughly purged with nitrogen were charged 1 l of n-hexane and 0.24 mmol of triethylaluminum, followed by heating. When the temperature reached 90° C., hydrogen was introduced therein to a partial pressure of 7.0 kg/cm²G. Ethylene was fed thereto to a partial pressure of 14 kg/cm²G through a catalyst feed pipe containing 30 mg of the solid catalyst component prepared in Example 1. Polymerization reaction was continued while maintaining the total pressure constant until the cumulative amount of ethylene fed reached 320 g. The reaction vessel was cooled and, simultaneously, the gas phase was purged. A portion of the slurry was taken out to determine the molecular weight of the polymer thus produced (first stage polymerization). The ethylene homopolymer produced in the first stage polymerization was designated polymer A.

Then, the autoclave was kept at 65° C., and ethylene, hydrogen, and butene-1 were fed thereto to partial pressures of 4.0 kg/cm², 0.1 kg/cm², and 0.2 kg/cm², respectively, to conduct polymerization (second stage polymerization). When the cumulative amount of ethylene fed reached 15% of the total polymer produced, ethanol was introduced therein under pressure to stop the reaction. The ethylene/butene-1 copolymer produced in the second stage polymerization was designated polymer B. The polymer produced was collected by filtration and dried to recover 377 g of the total polymer (polymer A and polymer B). The resulting polymer was kneaded and pelletized by means of an extruder (diameter: 30 mm). The results of measurements are shown in Table 3 below.

EXAMPLE 17

Ethylene polymerization was carried out in the same manner as in Example 16, except for changing the reaction conditions as shown in Table 3. The results of measurements are also shown in Table 3.

TABLE 3

| | Example 16 | Example 17 |
|---|---|---|
| First Stage: | | |
| Reaction Temperature (°C.) | 90 | 90 |
| H₂/Ethylene Molar Ratio | 0.80 | 1.50 |
| Yield of Polymer A (g) | 320 | 250 |
| A/(A + B) (wt %) | 85 | 65 |
| Molecular Weight of Polymer A | 84,000 | 45,000 |
| Second Stage: | | |
| Reaction Temperature (°C.) | 65 | 65 |
| H₂/Ethylene Molar Ratio | 0.025 | 0.035 |
| Butene-1/Ethylene Molar Ratio | 0.05 | 0.045 |
| Yield of Polymer B (g) | 57 | 135 |
| (B)/(A + B) (wt %) | 15 | 35 |
| Molecular weight of Final Product (Polymer A + Polymer B): | 1,540,000 | 1,150,000 |
| B/A Molecular Weight Ratio | 18.3 | 25.6 |
| Melt Index (g/10 min) | 0.20 | 0.13 |
| Intrinsic Viscosity (dl/g) | 3.52 | 4.61 |
| Density (g/cm³) | 0.953 | 0.954 |
| Butene-1 Content (wt %) | 0.70 | 0.65 |
| Melt Tension at 190° C. (g) | 22.1 | 19.8 |
| Die Swell Ratio at 190° C. | 5.9 | 4.8 |
| $\eta_0$ (poise) | $5.9 \times 10^7$ | $4.9 \times 10^7$ |
| Izod Impact Strength (kg·cm/cm): | | |
| 23° C. | 60 NB | 63 NB |
| −40° C. | 58 NB | 60 NB |
| Fish Eye | none | none |

According to the process of the present invention, an olefin polymer having broad molecular weight distribution, high melt tension, and high melt elasticity (die swell ratio) can be obtained with good efficiency. The resulting olefin polymer can be freed of fish eyes by kneading under ordinary conditions.

While the invention has been described in detail and with reference to specific examples thereof, it will be apparent to one skilled in the art that various changes and modifications can be made therein without departing from the spirit and scope thereof.

What is claimed is:

1. A process for producing an ethylene homopolymer or an ethylene copolymer containing up to 10% by weight of other α-olefins by slurry polymerization in the presence of a catalyst system comprising (A) a hydrocarbon-insoluble solid catalyst component obtained by treating a uniform hydrocarbon solution containing:

(a) a magnesium compound represented by the formula $Mg(OR^1)_m X^1_{2-m}$, wherein $R^1$ represents an alkyl group, an aryl group, or a cycloalkyl group, $x^1$ represents a halogen atom; and m represents 1 or 2, (b) a titanium compound represented by the formula $Ti(OR^2)_n X^2_{4-n}$, wherein $R^2$ represents an alkyl group, an aryl group, or a cycloalkyl group; $X^2$ represents a halogen atom; and n represents an integer of from 1 to 4, and (c) a polyalkyltitanate represented by formula (1):

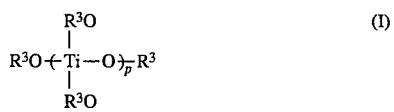

wherein plural $R^3$'s, which may be the same or different, each represent an alkyl group, an aryl group, or a cycloalkyl group: and p represents an integer of from 2 to 20, with a halogenating agent selected from the group consisting of titanium tetrachloride and silicon tetrachloride, wherein said magnesium compound (a), titanium compound (b), and polyalkyltitanate (c) are used in molar ratios of $0.01 \leq (b)/(a) \leq 10$ and $0.5 \leq (c)/(a) \leq 50$ and (B) an organoaluminum compound, wherein said organoaluminum compound (B) is present in a concentration of from 0.01 to 0.5 mmol/l based on the amount of a polymerization solvent used and at an atomic ratio of Al to Ti in said solid catalyst component (A) of from 0.1 to 3.5.

2. A process as claimed in claim 1, wherein said hydrocarbon solution further contains (d) an alcohol represented by formula $R_4OH$ wherein $R^4$ represents an alkyl group, an aryl group, or a cycloalkyl group.

3. A process as claimed in claim 1, wherein said organoaluminum compound (B) is triethylaluminum or a combination of triethylaluminum and diethylaluminum monochloride and said magnesium compound (a), titanium compound (b), and polyalkyltitanate (c) are used at molar ratios of $0.05 \leq (b)/(a) \leq 5$ and $0.5 \leq (c)/(a) \leq 10$.

4. A process as claimed in claim 1, wherein said organoaluminum compound (B) is dialkylaluminum chloride and said magnesium compound (a), titanium compound (b), and polyalkyltitanate (c) are used at molar ratios of $0.05 \leq (b)/(a) \leq 5$ and $0.5 \leq (c)/(a) \leq 1$.

5. A process as claimed in claim 1, wherein the polymerization is carried out in multiple stages.

6. A process as claimed in claim 5, wherein ethylene is homopolymerized in either one of first and second reaction zones to form a polymer A having a viscosity-average molecular weight of from greater than 40,000 to 150,000 to a proportion exceeding 60% by weight and not more than 90% by weight based on the total polymer produced while, in the other reaction zone, ethylene is homopolymerized or copolymerized with other α-olefin(s) to form a polymer B having an α-olefin content of not more than 10% by weight and a viscosity-average molecular weight of from 500,000 to 4,000,000 to a proportion of from 10 to 40% by weight based on the total polymer produced, the molecular weight ratio of the polymer B to the polymer A is adjusted to 3 to 50, and the melt index of the total polymer produced is adjusted so as not to exceed 0.5 g/10 min as measured according to ASTM-1238 57T at 190° C. under a load of 5 kg.

7. A process as claimed in claim 1, wherein said magnesium compound (a) is dimethoxymagnesium, diethoxymagnesium, ethoxymagnesium chloride, or diphenoxymagnesium.

8. A process as claimed in claim 1, wherein said magnesium compound (a) is diethoxymagnesium.

9. A process as claimed in claim 1, wherein said titanium compound (b) is titanium tetra-n-butoxide.

10. A process as claimed in claim 1, wherein said polyalkyltitanate (c) is a compound of formula (I) wherein $R^3$ is a butyl group or an isopropyl group.

11. A process as claimed in claim 1, wherein R1, R2, and R3 each represents an alkyl group or aryl group.

12. A process as claimed in claim 11, wherein R1, R2, and R3 each represents an alkyl group.

13. A process as claimed in claim 6, wherein said molecular weight is from 45,000 to 150,000.

* * * * *